US012497792B1

(12) United States Patent
Ley et al.

(10) Patent No.: US 12,497,792 B1
(45) Date of Patent: Dec. 16, 2025

(54) 3D CONCRETE PRINTING METHODS AND SYSTEM

(71) Applicant: The Board of Regents for the Oklahoma Agricultural and Mechanical Colleges, Stillwater, OK (US)

(72) Inventors: Matthew Tyler Ley, Stillwater, OK (US); James Arthur Beckstrom, Stillwater, OK (US); Ryan Frederick Smeeton, Stillwater, OK (US); Weston Thomas Allen, Lewisville, TX (US); Mohammed Faraz Khan, Stillwater, OK (US); Myung Kyu Kim, Stillwater, OK (US)

(73) Assignee: THE BOARD OF REGENTS FOR THE OKLAHOMA AGRICULTURAL AND MECHANICAL COLLEGES, Stillwater, OK (US)

( * ) Notice: Subject to any disclaimer, the term of this patent is extended or adjusted under 35 U.S.C. 154(b) by 309 days.

(21) Appl. No.: 17/902,454

(22) Filed: Sep. 2, 2022

Related U.S. Application Data

(60) Provisional application No. 63/240,707, filed on Sep. 3, 2021.

(51) Int. Cl.

| | |
|---|---|
| ***E04G 21/04*** | (2006.01) |
| ***B28B 1/00*** | (2006.01) |
| ***E04G 21/12*** | (2006.01) |

(52) U.S. Cl.
CPC ......... *E04G 21/0418* (2013.01); *E04G 21/12* (2013.01); *B28B 1/001* (2013.01)

(58) Field of Classification Search
CPC . E04G 21/0418; E04G 21/12; E04G 21/0445; B28B 1/001
(Continued)

(56) References Cited

U.S. PATENT DOCUMENTS

| | | | | |
|---|---|---|---|---|
| 1,995,692 A * | 3/1935 | Urschel | E04G 11/04 | 249/20 |
| 2,562,403 A * | 7/1951 | Ahart | E04G 11/34 | 249/20 |

(Continued)

FOREIGN PATENT DOCUMENTS

| | | |
|---|---|---|
| DE | 102021101138 A1 | 7/2022 |
| WO | 2020150682 A1 | 7/2020 |

OTHER PUBLICATIONS

Pshtiwan Shakor, Jarred Renneberg, Shami Nejadi and Gavin Paul, Optimisation of Different Concrete Mix Designs for 3D Printing by Utilising 6DOF Industrial Robot, 34th International Symposium on Automation and Robotics in Construction (ISARC 2017).

(Continued)

*Primary Examiner* — Emmanuel S Luk
(74) *Attorney, Agent, or Firm* — Ballard Spahr LLP

(57) ABSTRACT

A system for forming a concrete member has a first side plate defining a delivery opening for permitting flow of a cementitious mixture therethrough and a second side plate spaced from and movable with the first side plate. The first side plate and second side plate define a space with a plurality of sections. The first and second side plates are movable in a first pass along a travel path such that the cementitious mixture is received in the space through the delivery opening and squeezed from a first width to a second width as the first and second side plates move along the travel path.

26 Claims, 14 Drawing Sheets

(58) Field of Classification Search
USPC .............................................. 425/60, 375, 63
See application file for complete search history.

(56) References Cited

U.S. PATENT DOCUMENTS 2,877,530 A * 3/1959 Winn, Jr. ................ E04G 11/20 425/DIG. 126
3,195,208 A * 7/1965 Winn, Jr. ................ E04F 21/12 425/63
3,468,001 A * 9/1969 Bodine, Jr. ............. B28B 1/084 425/174.2
3,685,405 A * 8/1972 McDonald .......... E01C 19/4893 404/115
3,897,298 A * 7/1975 Gray ....................... E04B 1/166 425/89
3,922,125 A * 11/1975 Christensen ........ B29C 33/0033 425/115
3,966,533 A * 6/1976 Goldsworthy ............ E04H 7/02 264/32
3,981,603 A * 9/1976 Sprunger ............ E01C 19/4893 404/105
4,063,857 A * 12/1977 Thoma .................... E04G 11/22 249/20
4,066,723 A * 1/1978 King ....................... E01C 11/18 404/100
4,320,075 A * 3/1982 Nielson ................... E04G 11/34 264/32
4,361,530 A * 11/1982 Peer ........................ B29C 48/05 425/327
4,374,790 A * 2/1983 McGowan .............. E04G 21/04 264/32
5,198,235 A * 3/1993 Reichstein ................ B28B 5/00 425/150
5,529,471 A * 6/1996 Khoshevis .............. B29C 41/36 425/150
5,766,524 A * 6/1998 Rashwan ................ B28B 1/004 264/162
6,210,142 B1 * 4/2001 Huesers .................. E04G 11/04 425/441
7,153,454 B2 * 12/2006 Khoshnevis .......... B29C 64/118 425/375
7,452,196 B2 * 11/2008 Khoshnevis ............ B28B 1/001 425/114
7,641,461 B2 * 1/2010 Khoshnevis ........ E04G 21/0463 425/375
7,878,789 B2 * 2/2011 Khoshnevis ............ B28B 1/001 425/461
8,113,807 B2 * 2/2012 Wilkinson .............. E04G 11/04 425/375
8,317,502 B1 * 11/2012 Grey ....................... B28B 11/10 404/128
8,568,121 B2 * 10/2013 Khoshnevis .............. B28B 3/20 425/63
8,621,817 B1 * 1/2014 Kreizinger .............. E04F 21/04 366/31
8,801,415 B2 * 8/2014 Khoshnevis ........ E04G 21/0463 425/375
9,174,391 B2 * 11/2015 Hartmann ............... B29C 64/25
9,506,905 B2 11/2016 Ley et al.
10,059,058 B2 * 8/2018 Hartmann ............... B22F 3/003
10,066,413 B2 * 9/2018 Khoshnevis .......... E04H 12/341
10,307,959 B2 * 6/2019 Northrup .............. B29C 64/165
10,486,330 B2 * 11/2019 Giles .......................... B28B 3/20
10,829,927 B2 * 11/2020 Houston ............... E04B 1/3404
11,214,967 B1 * 1/2022 Scepaniak .............. B65G 67/24
11,964,434 B2 * 4/2024 Grasegger ............. B29C 64/214
2005/0196482 A1 * 9/2005 Khoshnevis ............ E04G 11/34 425/207
2007/0138678 A1 * 6/2007 Khoshnevis .......... E04B 1/3505 52/561
2018/0093373 A1 4/2018 Niederberger
2019/0308342 A1 10/2019 Butler
2021/0129377 A1 5/2021 Mo et al.
2021/0347086 A1 11/2021 Von Limburg et al.
2022/0364364 A1 11/2022 Shi et al.

OTHER PUBLICATIONS

Refilwe Lediga and Deon Kruger, "Optimizing Concrete Mix Design for Application in 3D Printing Technology for the Construction Industry," Article in Solid State Phenomena, Sep. 2017.
Guangchao Ji, Tao Ding, Jianzhuang Xiao, Shupeng Du, Jun Li and Zhenhua Duan, "A 3D Printed Ready-Mixed Concrete Power Distribution Substation: Materials and Construction Technology," Published May 10, 2019.
URL and screen shots from You Tube video (undated but admitted to be prior art).

* cited by examiner

| Material | Source of Material | Weight (lbs/cy) | Specific Gravity | Volume ($ft^3$) |
|---|---|---|---|---|
| Coarse I | RS-57 | 1232.4 | 2.75 | 7.18 |
| Coarse II | RS-57 3/8s | 426 | 2.72 | 2.51 |
| Coarse III | --- | 0 | 0 | 0.00 |
| Fine I | Dover | 1387 | 2.61 | 8.52 |
| Fine II | --- | 0 | 0 | 0.00 |
| Cement | OPC | 526 | 3.15 | 2.68 |
| Fly Ash | RED ROCK | 132 | 2.5 | 0.84 |
| Other Cementitious | --- | | | 0.00 |
| Water | --- | 244.4 | 1 | 3.92 |
| Air | 5.00% | | | 1.35 |
| Total | | 3948.4 | | 27.00 |

| Admixture Type | Name | Dosage |
|---|---|---|
| Water reducer | DARCEM 55 | 13 oz/cwt |
| VMA | NANO - CLAY | 19.2 oz/cwt |
| Retardant | CITRIC ACID | 0.25% by weight of Cement + Fly Ash |

FIG. 18

3D CONCRETE PRINTING METHODS AND SYSTEM

CROSS REFERENCE TO RELATED APPLICATION

The present application claims priority to U.S. Provisional Application No. 63/240,707 filed on Sep. 3, 2021, incorporated herein by reference.

FIELD

This disclosure is related to the field of construction of concrete structures.

DESCRIPTION OF THE DRAWINGS

FIG. 9 is a view looking down at the concrete member creating device.

FIG. 16 is a view of the upper connection of the support arm beams.

DESCRIPTION OF AN EMBODIMENT

Figure 1:
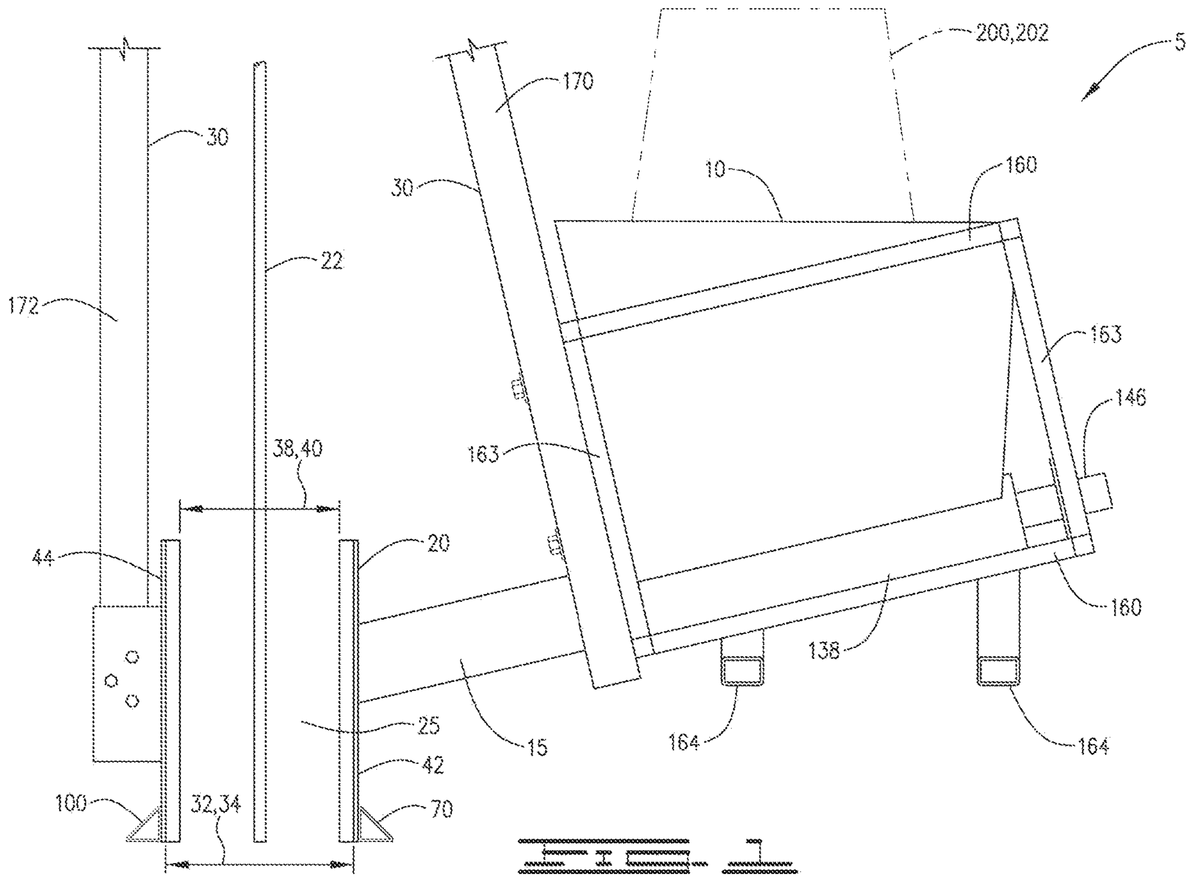
FIG. 1 is an end view of the system of the current disclosure.

Referring now to the figures, a system 5 for creating and forming a concrete member 6 is shown. In one embodiment, the system 5 is a system for creating a concrete member 6 which may be for example a concrete wall of a desired length and width while only using stationary formwork or existing material that is perpendicular to the length of the wall at the starting and ending of the wall but not on the sides thereof. Stationary concrete formworks are supports typically made of wood, metal, and sometimes plastic to support wet concrete while it is placed. These forms are stationary during the construction of the concrete member and stay in place until the member gains a sufficient strength. These forms are then typically removed and are reused. The embodiment of system 5 is suitable for carrying out methods to manufacture concrete member 6 as an upright concrete wall on a surface 7. Concrete member 6 has a rear end 9 and a forward end 11. However, systems 5 and **5*a* may also be used to practice methods that produce other concrete members, such as slabs, beams and other members. Thus, while the exemplary concrete member 6 is shown as a straight, upright member, it is understood that the device and methods claimed herein may be used in various embodiments to create slanted members and curved members. System 5 may comprise a container 10 for receiving a cementitious mix which may in one embodiment be a cementitious mix that retains its shape after placement without the need for stationary forms along the length of the concrete member 6. While there is no need for stationary forms along the length of the concrete member creating device 20, stationary formwork or existing material that is perpendicular to the length of the wall may be used at the starting and ending of the wall but no stationary formwork is used on the sides. Container 10** may be for example a hopper for receiving the cementitious mix.

System 5 includes a delivery pipe 15 is connected to container 10 at one end and at another end to a concrete member creating device 20 which in one embodiment may be referred to as concrete wall creating device 20. Concrete member creating device 20 may be referred to herein simply as device 20. Delivery pipe 15 as will be described in more detail will communicate the cementitious mix from container 10 into a concrete member creating space 25 defined by device 20. Concrete member creating space 25 may be at times referred to a wall forming space 25, but will be primarily referred to herein as creating space 25. Device 20 is movable directionally both horizontally and vertically. Horizontal is the direction parallel to surface 7 and vertical is perpendicular to surface 7. Device 20 is movable not only horizontally and vertically, but in a combination of both. In other words, device 20 can be moved at angles that deviate from both the horizontal and the vertical. Delivery pipe 15 will deliver a cementitious mix from container 10 into space 25 defined by device 20. The cementitious mixture received therein will be squeezed by device 20 as the device 20 moves along travel path 8 from a first width to a second narrower width which may be for example a final desired thickness. In the embodiment shown, the container 10 is slightly tilted in operation, and the cementitious mix enters concrete member forming device 20 at an angle of about 30° from horizontal. Container 10 may also be tilted at an angle in a direction in and out of the page as shown in FIG. 1 from perpendicular by about 30°. The angles herein are exemplary, and it is understood that container 10 can be positioned and oriented as necessary so that the cementitious mix will be delivered into creating space 25. Device 20 forms and provides a desired surface finish on the concrete member 6. In addition, device 20 consolidates the cementitious mix around reinforcement members 22.

Figure 8:
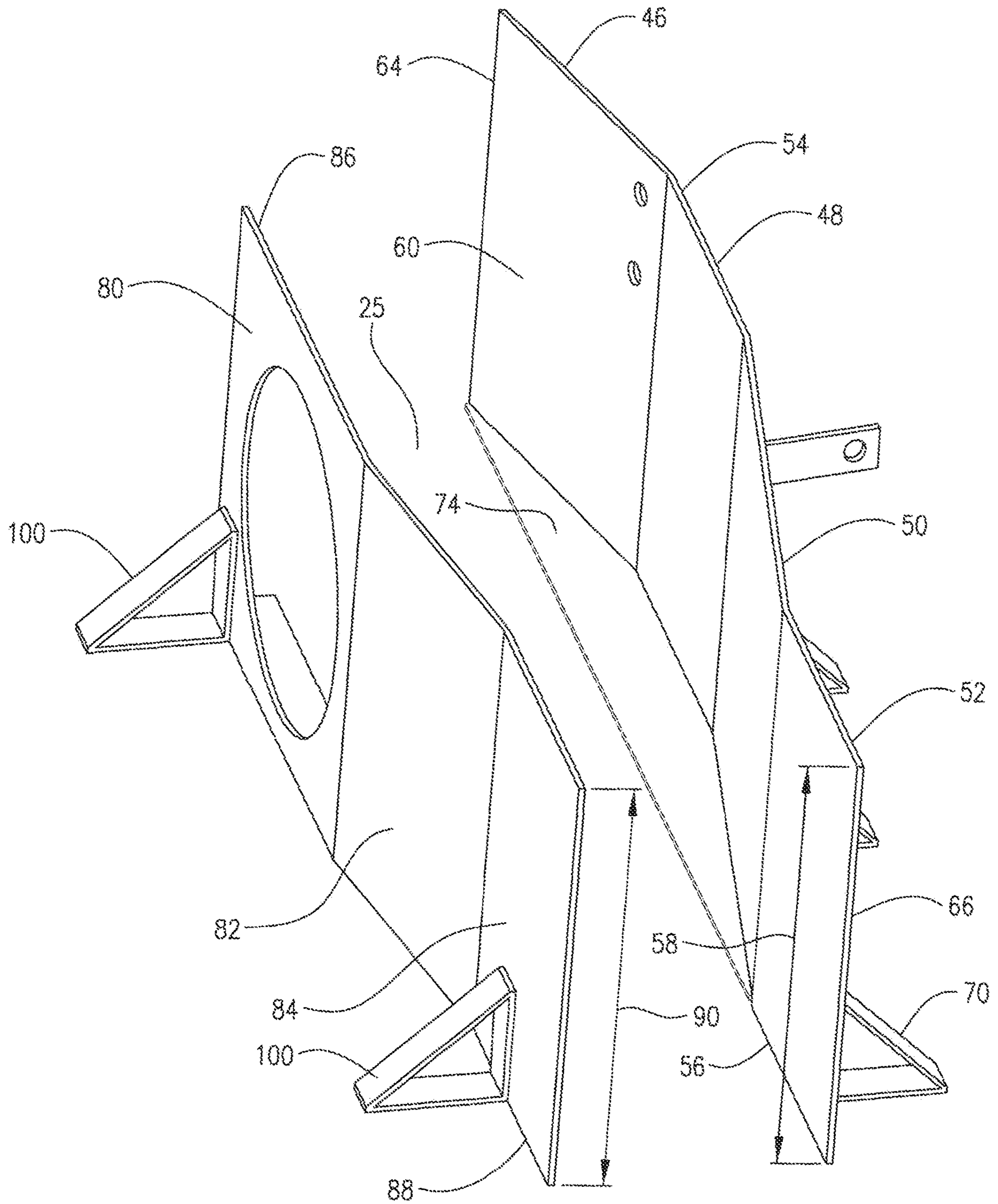
FIG. 8 is a perspective view of the concrete member creating device of the current disclosure.
Figure 8:
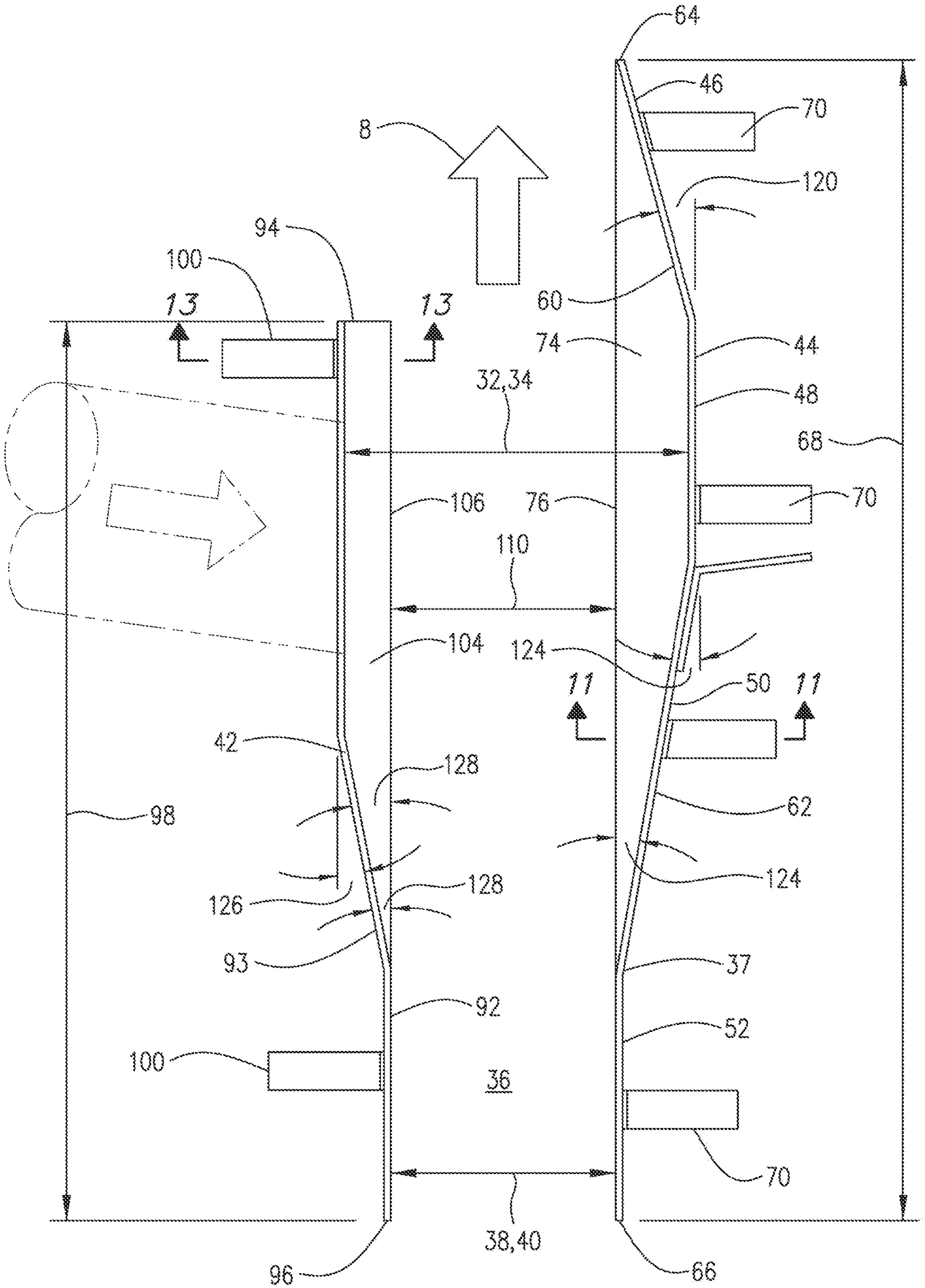

In one described embodiment a support arm 30 connects container 10 to device 20. The connection of support arm 30 to container 10 and device 20 is such that container 10 and device 20 will move simultaneously. The details of device 20 are better seen in FIGS. 8 and 9. In other embodiments independent arms or vehicles may be used to move the different portions of device 20. Device 20 serves as a moving concrete form for constructing concrete members like those described above. One such embodiment is shown schematically in FIG. 17 which will be explained in more detail below.

Creating space 25 defined by device 20 may comprise a plurality of sections, which may include first, second and third sections 34, 36 and 40 respectively. In one embodiment the creating space 25 defined by device 20 narrows from a first width to a second width as the device 20 moves along travel path 8. Thus, creating space 25 may comprise a width 32 in a first section 34. A second section 36 extends rearwardly toward a rear of device 20. Second section 36 terminates at and is connected to a third section 40 which has a width 38. As is apparent from the drawings, width 38 is narrower than width 32 such that the cementitious mix received in device 20 will be squeezed from the initial width 32 to a finished width 38 which is a desired width of the concrete member 6 after the device 20 has squeezed the cementitious mix. In operation a cementitious mix is received in first section 34, which may be referred to as a receiving section. As device 20 moves, the cementitious mix passes through second section 36 which converges from first section 34. Second section 36 may thus be referred to as a convergent section 36. Third section 40 is the final section through which the cementitious mix passes and may be referred to as a finish section. Device 20 thus defines a width into which the cementitious mix is received, and in the embodiment described defines a plurality of widths including width 32 and width 38, which is narrower than width 32. While the described embodiment has a narrowing width from the first to the third sections 34 and 40 thereof, it is understood that a device with a consistent, or unchanging width may be used.

Device 20 comprises a first side plate 42 and a second side plate 44 spaced therefrom. Space 25 is defined by and between first and second plates 42 and 44 respectively. In the described embodiment, the first side plate 42 and second side plate 44 have a specific geometry that provides for the creation of a concrete member 6 utilizing the system 5 without the need for stationary concrete forms parallel to the long dimension of the concrete member 6.

Second side plate 44 comprises a first or containment section 46, a second or receiving section 48, a third or convergent section 50 and a fourth or finishing section 52. Second side plate 44 has upper edge 54 and lower edge 56 defining a height 58. Second side plate 44 has interior side 60, exterior side 62, forward edge 64 and rear edge 66 defining a length 68. A plurality of angle brackets 70 are connected to exterior 62. Angle brackets 70 have a bottom surface 72. Second side plate 44 has a drip guard 74 with an inner edge 76 and a bottom surface 78. Angle brackets 70 are connected such that bottom surface 72 is aligned with lower edge 56 of second side plate 44 and bottom surface 78 of drip guard 74. As will be explained in more detail below, angle brackets 70 may be utilized to connect additional plates, referred to as drop down plates, to second side plate 44. Inner edge 76 of drip guard 74 does not extend radially inwardly past the interior side 60 on finish section 52. In other words, inner edge 76 may be coplanar with interior side 60 of second side plate 44 on finishing section 52.

First side plate 42 has delivery opening 43 defined in a first or receiving section 80. First side plate 42 has a second or converging section 82 and a third or finish section 84. First side plate 42 has upper edge 86, lower edge 88 and a height 90 therebetween. Height 90 is in one embodiment the same as height 58. First side plate 42 has interior side 92, exterior side 93, forward edge 94, rear edge 96 and length 98 between forward and rear edges 94 and 96. A plurality of angle brackets 100 are connected to exterior side 93 and have a lower surface 102 that is coplanar with lower edge 88 of first side plate 42. A drip guard 104 is connected to first side plate 42 and extends inwardly from the interior side 92 along a portion of the length of first side plate 42. Drip guard 104 has inner edge 106 and bottom surface 108. Inner edge 106 is aligned with and coplanar to interior surface 92 in finish section 84 and bottom surface 108 of drip guard 104 is coplanar with lower edge 88 of first side plate 42 and lower surface 102 of angle bracket 100. A distance 110 between inner edge 106 of drip guard 104 and inner edge 76 of drip guard 74 is identical to width 38 in finishing section 40 of the device 20.

Containment section 46 of second side plate 44 serves to prevent concrete from spilling out of the device 20 past forward edge 64 of the device 20. Receiving section 48 is generally parallel to the horizontal direction of travel of the concrete forming device 20 as concrete member 6 is being formed and containment section 46 is angled inwardly at an angle 120. Angle 120 may be as desired to contain the cementitious mixture delivered into device 20 and may be for example in a range between 0° and 90°, and further may be in a range between 10° and 20° and in one embodiment about 15°. Convergent section 50 is connected to receiving section 48 and is angled inwardly therefrom at an angle 122. Angle 122 may be for example in the range of between about 5° and about 15° and in one embodiment may be about 10°. Finish section 52 is parallel to the direction of travel of the concrete forming device 20 and an angle 124 is defined between convergent section 50 and finish section 52. Angle 124 may be in a range from about 5° to about 15° and may be in one embodiment about 10°. Thus, convergent section 50 is angled outwardly from finish section 52 at angle 124.

Receiving section 80 of first side plate 42 is parallel to the horizontal direction of travel of the device 20. An angle 126 is defined at the transition from receiving section 80 to convergent section 82. Angle 126 may be in the range of about 5° to about 15° and in one embodiment is about 10°. An angle 128 is defined at the transition from convergent section 82 to finish section 84. Angle 128 is in one embodiment in the range of about 5° to about 15° and in particular in one embodiment may be about 10°. As is apparent from the drawings finish sections 84 and 52 of first side plate and second side plate 42 and 44, respectively, are parallel and are parallel to the direction of travel of the device 20 along travel path 8. Although specific ranges for angles 120, 122, 124, 126 and 128 are identified herein, it is understood that the angles may be adjusted depending on the type of cementitious mix used, the speed of travel of system 5 and the desired finish. The velocity along the travel path 8 of the device 20 and the cementitious mixture delivery rate are coordinated and controlled to maintain a desired height of the layer of the concrete member being placed.

Container 10, which may be described as a concrete or cementitious mix receiving container 10, has upper opening 130 through which the cementitious mix may be received. Container 10 defines a hopper interior 131 into which the cementitious mix is poured through upper opening 130. Hopper 10 has right side wall 132 and left side wall 133. Right and left side walls 132 and 133 slope inwardly from the upper ends thereof toward a bottom 138 of container 10. Container 10 has forward end wall 134 and rear end wall 136. Bottom 138 is a curved bottom to provide for the placement of an auger 140 therein.

Auger 140 comprises an auger shaft 142 with auger flights 144. Auger flights 144 may be of the type that have rubber tips on the end thereof. One type of auger may be for example a rubber flighted auger manufactured by Danuser®. Auger 144 is a steel and rubber flighted auger, with the steel flights extended with a strip of rubber at the edge thereof.

Auger shaft 142 is rotated by a motor 146 which may be a hydraulic motor, electric motor or any type known in the art to provide rotation. The cementitious mixture may be delivered into hopper 10 via a delivery chute 148 or other means. As is explained in more detail below, the cementitious mix may be delivered by any method such as for example from a cement truck or other cementitious mix source. An opening 150 which may be referred to as a discharge opening is defined in hopper 10 through the forward wall 134 at the forward end thereof. The cementitious mixture delivered into hopper 10 will be delivered and discharged through opening 150 as a result of the rotation of auger 140. The cementitious mixture will be delivered from the hopper interior 131 into delivery pipe 15 and from delivery pipe 15 into the space 25 of device 20 through delivery opening 43 in first side plate 42. Auger flights 144 will extend past opening 150 and into delivery pipe 15 to urge the cementitious mix into space 25 through opening 43.

A support cage 154 may be connected to hopper 10 to provide structural support thereto and also to provide additional connecting means for support arm 30. Support cage 154 may comprise upper side rails 156, lower side rails 158, upper end rails 160 and lower end rails 162. Vertical support rails 163 may be connected at the corners of support cage 154 to the upper and lower end rails 160 and 162 and the upper and lower side rails 156 and 158. The upper and lower side rails 156 and 158 and upper and lower end rails 160 and 162 may be connected to one another and to container 10 by means known in the art such as for example with bolts, other fasteners or welding. In the embodiment described, stirrups 164 may be connected to lower side rails 158. As will be explained, the stirrups 164 may be utilized as a space for a lifting device to utilize for moving the container 10 horizontally and vertically.

Support arm 30 may be connected to container 10 with bolts, by welding or other means known in the art. The support arm may be connected directly to container 10, or may be connected to the support cage 154 or both. Support arm 30 comprises a first beam 170 connected to container 10 and extending upwardly therefrom. A second beam 172 is connected to first beam 170 and extends downwardly therefrom. The first and second beams 170 and 172 may be connected to one another by a connecting beam 174. The connections may be made by means known in the art such as bolts and/or welding. The support arm extends upwardly such that it extends up and over device 20 so as not to impede the travel of device 20 or to prevent the use of reinforcing members 22 in creating space 25 as device 20 travels along travel path 8. Second beam 172 is connected to the exterior side of second side plate 44.

Figure 10:
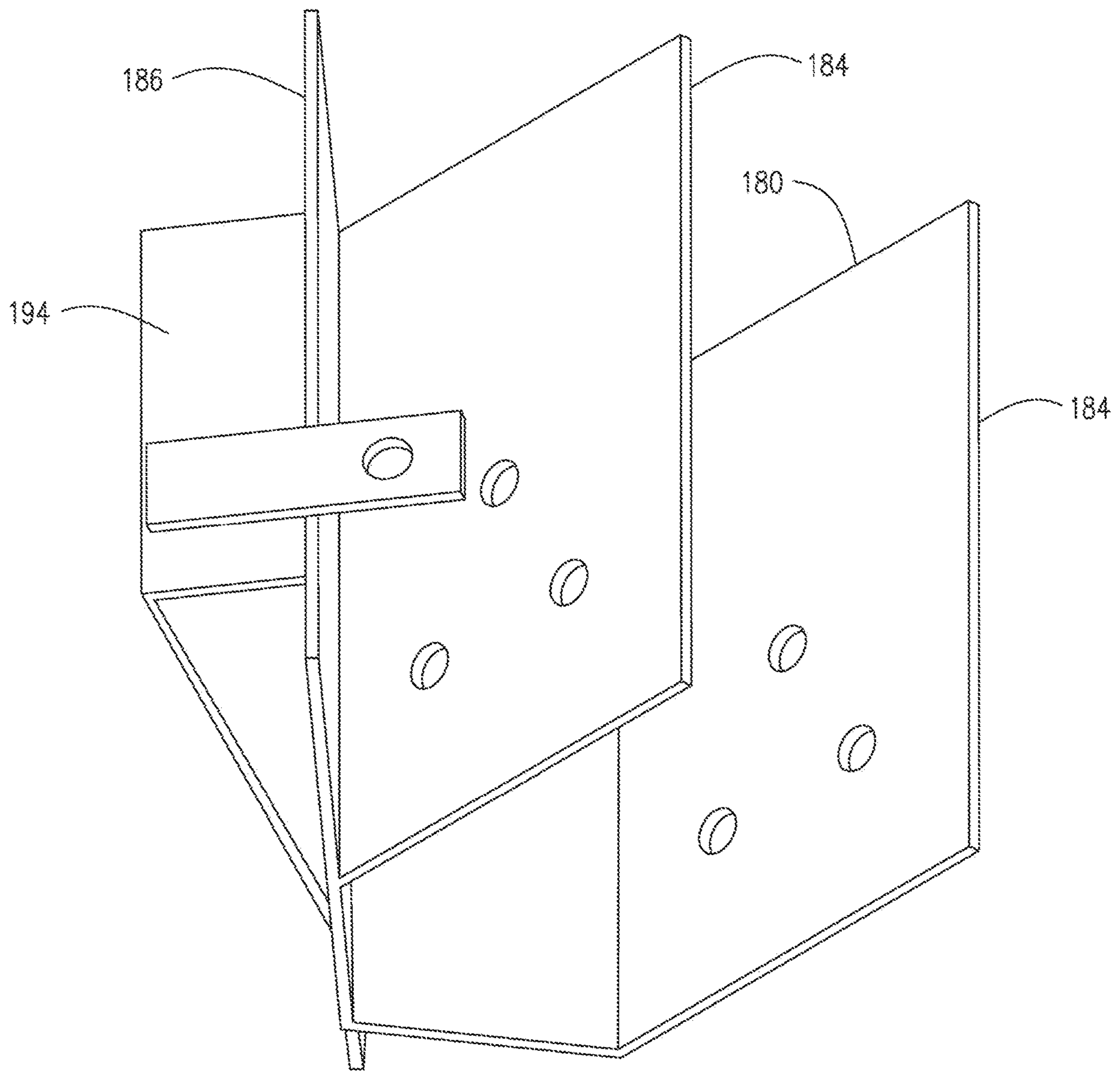
FIGS. 10 and 11 are views of a bracket utilized to connect a support arm to the concrete member creating device.
Figure 11:
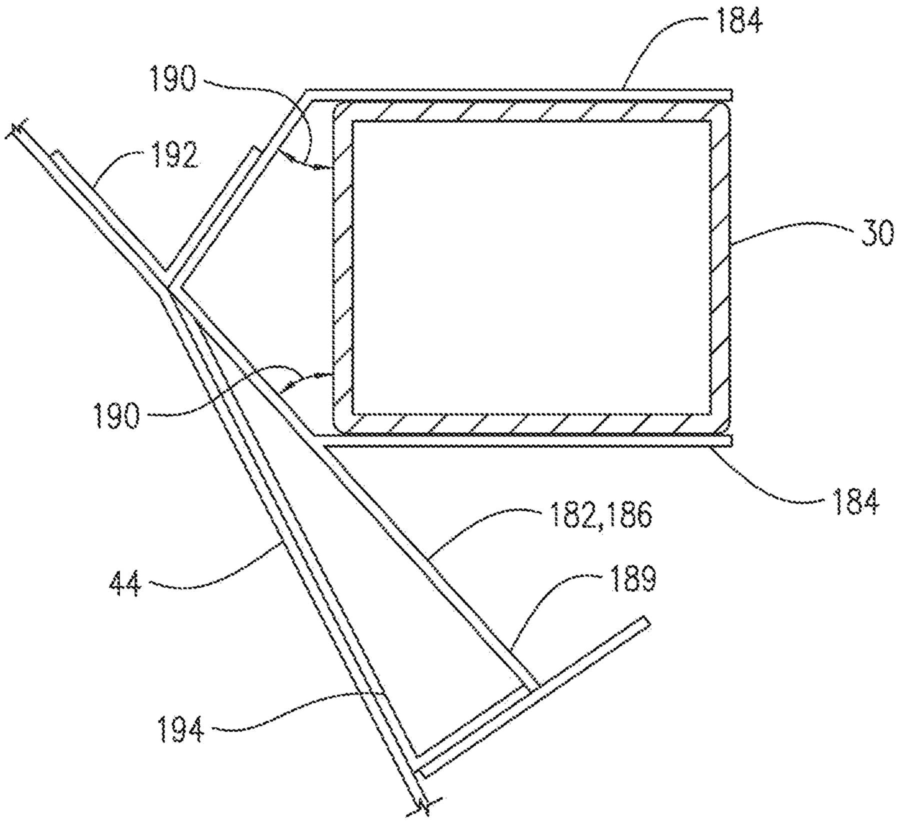

Because the support arm 30 is connected both to the container 10 and to the device 20, container 10 and device 20 will move simultaneously. Container 10 and device 20 will move together to create concrete member 6. Support arm 30 may be connected to the exterior side 62 of second side plate 44 by means known in the art such as welding and/or fasteners. One embodiment of a bracket 180 for connecting support arm 30 to second side plate 44 is shown in FIG. 11. FIGS. 10 and 11 show a bracket 180 which is a multiple piece bracket 180. Bracket 180 comprises a first bracket element 182 that has opposed parallel connecting legs 184. Support arm 30 may be connected to bracket 180 with bolts through legs 184. In the embodiment shown support arm 30 is connected to bracket 180 and to device 20 at the lower end of second support arm beam 172. The support arm may be connected to bracket 180 by welding or other means known in the art. Connecting legs 184 are connected to first and second support plates 186 and 188. An angle 190, which may be for example between 30° and 40°, is defined by and between support legs 184 and support plates 186 and 188, respectively.

An angle bracket 192 is connected to support plate 188 with a bolt or other means known in the art and is also connected to second side plate 44. Angle bracket 192 is connected to the receiving section 48 of second side plate 44. A second angle bracket 194 is connected to support plate 188, and is connected to second side plate 44 at the convergent section 50. Angle brackets 192 and 194 are positioned such that they define an angle 196 therebetween which matches the angle at the transition between the receiving and convergent sections 48 and 50 of the second side plate 44. This is only one manner of positioning and securing the device 20 to support arm 30, and other connecting means may be used.

System 5 is a mobile system that may be utilized for vertical concrete construction such as the construction of concrete member 6 which may be a vertical wall 6. In one embodiment the motive force for moving the device 20 and container 10 may be a transport unit 200 which may comprise for example a track loader, or other moving equipment 202. In such an embodiment, the forks of the track loader 202 will extend into stirrups 164. Track loader 202 can be utilized to move the system 5 in the desired direction, vertically, horizontally or at angles to the vertical and horizontal to create a concrete member of a desired length and height. FIG. 1 depicts the track loader 202 lifting the container 10. Container 10 may be tilted upwardly in a direction such that the container 10 slopes downward toward discharge opening 150. The tilt may be generated by the position of stirrups 164 as shown in FIG. 1, or in some cases tilted by the transport unit 200. Although the embodiment shown herein utilizes a track loader 202, it is understood that other equipment may be used as the transport unit 200, such as skid steers, powered industrial trucks, front end loaders and other moving equipment. System 5 may also be attached to a fixed mechanism such as an overhead gantry or track system. The transport units can be operated manually, semi-autonomously or fully autonomously guided with the help of navigation systems.

Figure 2:
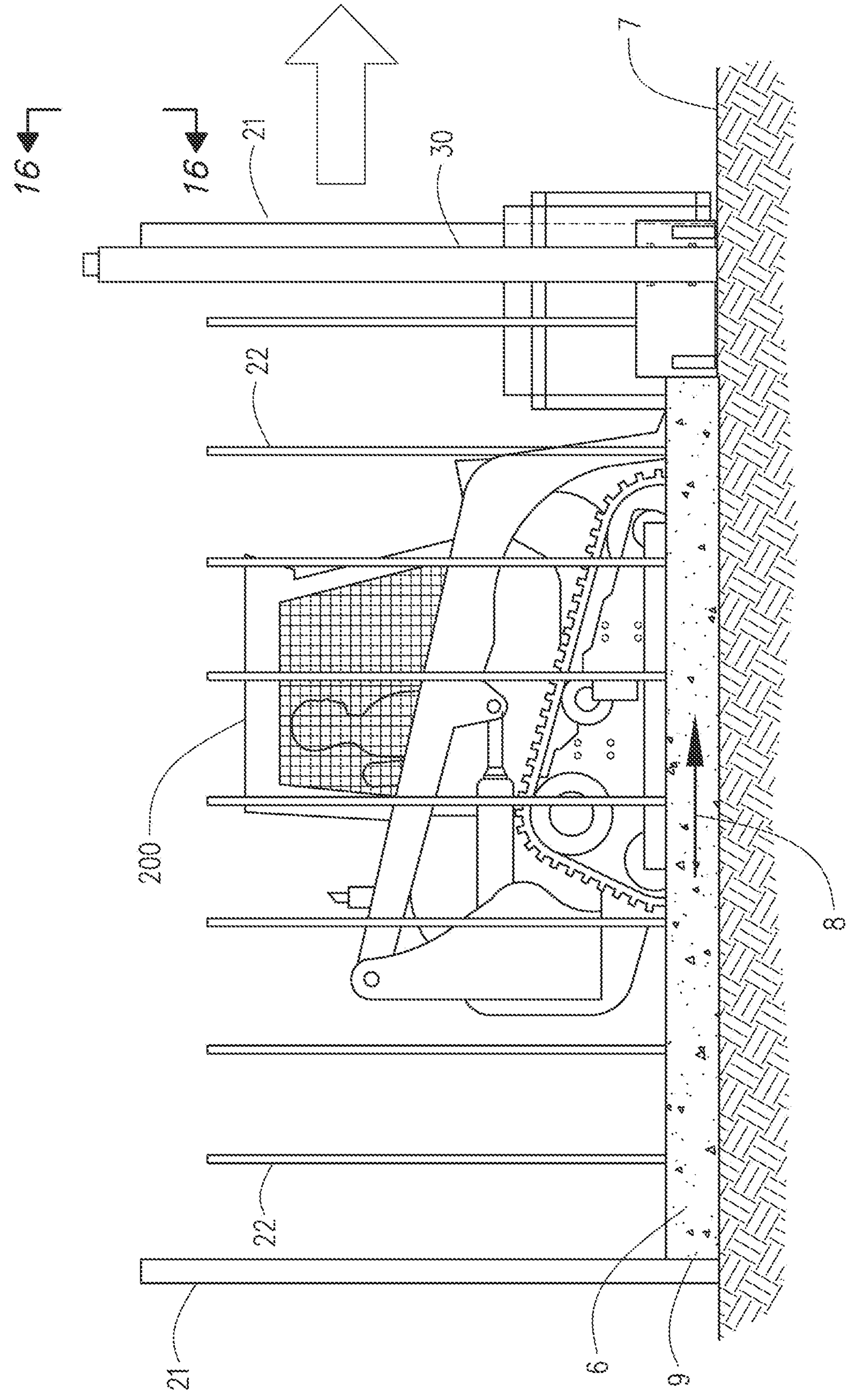
FIG. 2 is a side view depicting the system of the current disclosure as a concrete member is created.

FIG. 2 shows a view from the front of system 5 and schematically shows the container support arm 30, transport unit 200 and device 20. Device 20 is a travelling device 20 in that it will move as transport unit 200 moves container 10 and support arm 30. The view shown in FIG. 2 also includes reinforcing members 22 which may be for example vertical rebar. As shown therein, the reinforcing members 22 are positioned in travel path 8 of the device at selected intervals. Support arm 30 will extend from the container 10 upwardly so that it does not provide any interference and will provide for the placement of concrete around the vertically oriented reinforcing members 22 as each layer of concrete is created.

FIG. 2 shows a first layer of printed concrete and indicates the direction of movement. As noted, the direction of movement will be such that the cementitious mixture will enter the receiving section 34 of device 20 and will be squeezed by convergent section 36. Thus, device 20 will pass over the cementitious mixture in a direction such that the last contact is through the finish section 40 and a concrete member 6 of a desired strength and finish is created. Finish section 40 will squeeze the cementitious mixture to create the desired finish and also to consolidate the cementitious mixture around the reinforcing members 22.

Figure 3:
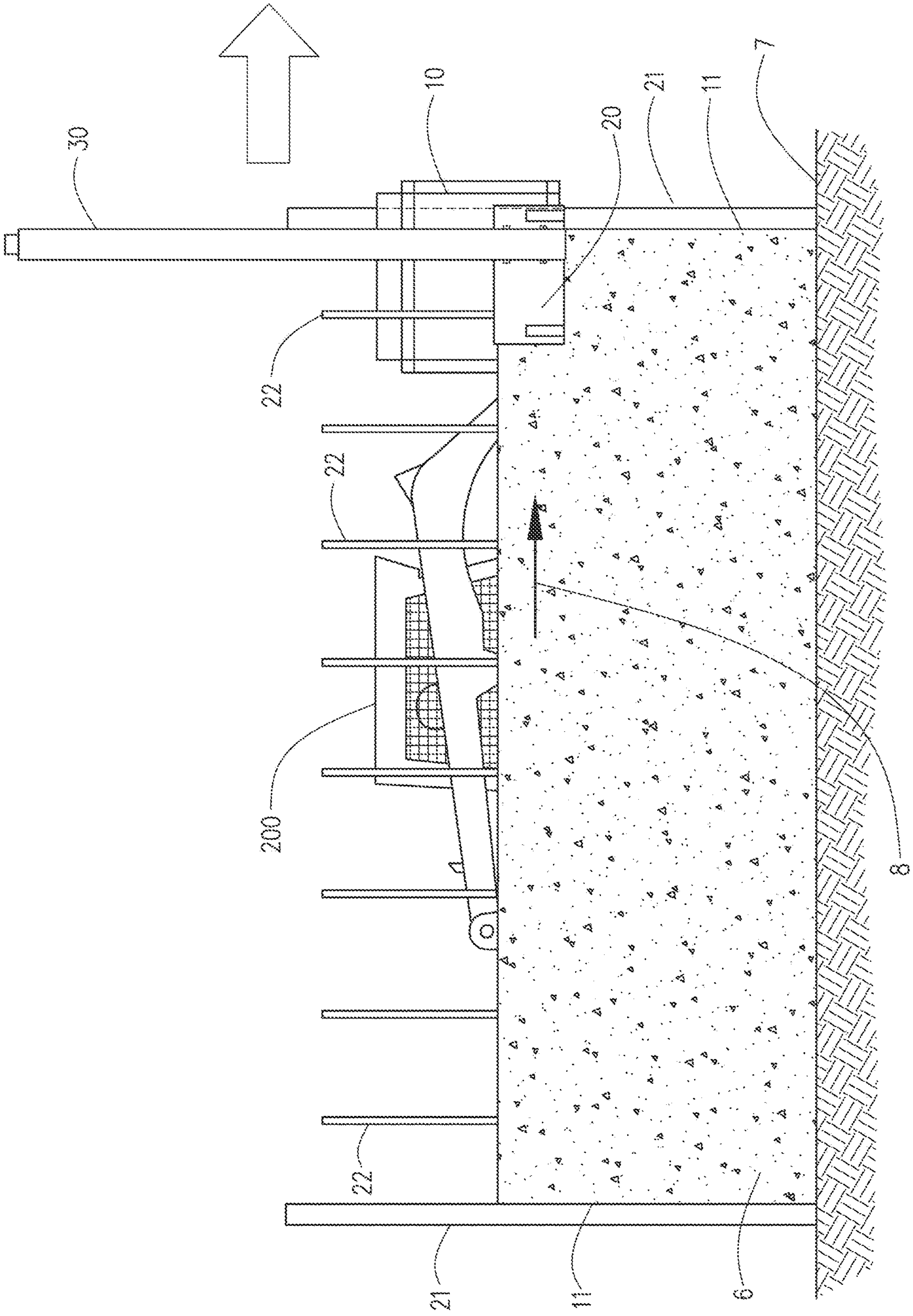
FIG. 3 is a side view showing a multiple layer structure created utilizing the system and method of the current disclosure.
Figure 4:
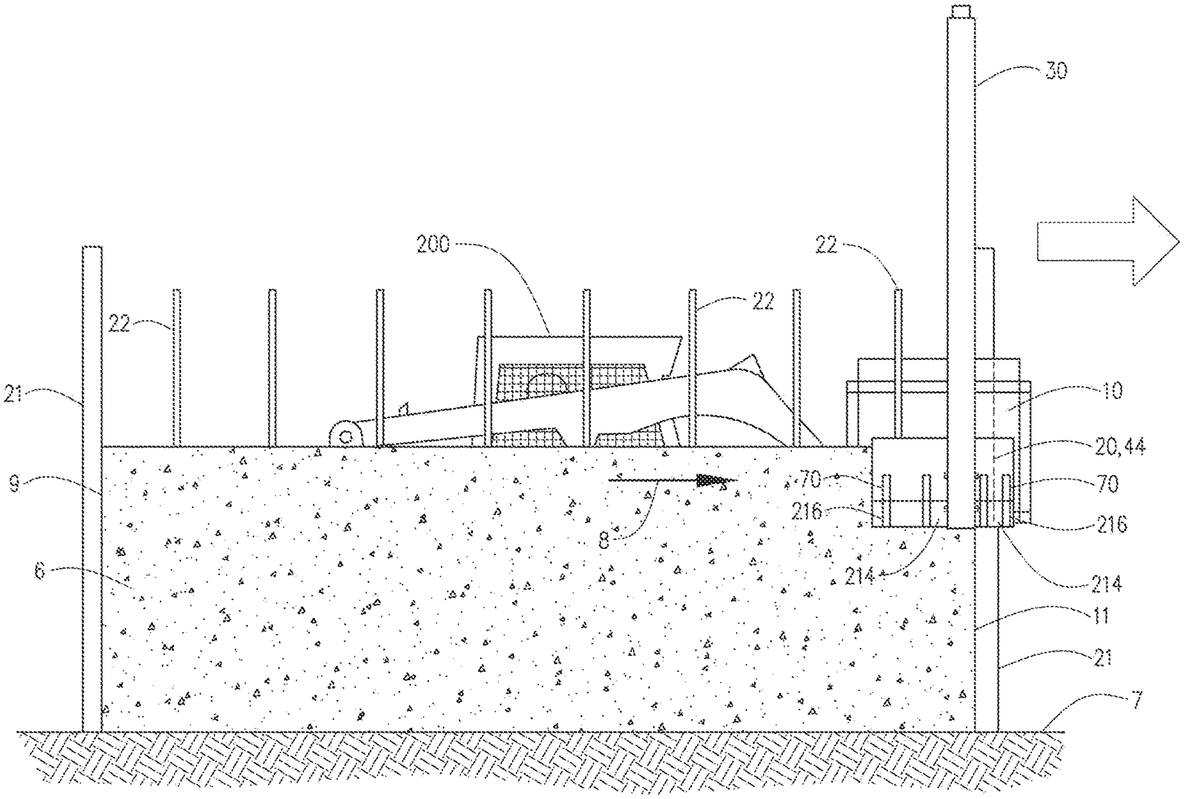
FIG. 4 shows a concrete member forming device creating a multiple layer structure with drop down plates connected thereto.
Figure 5:
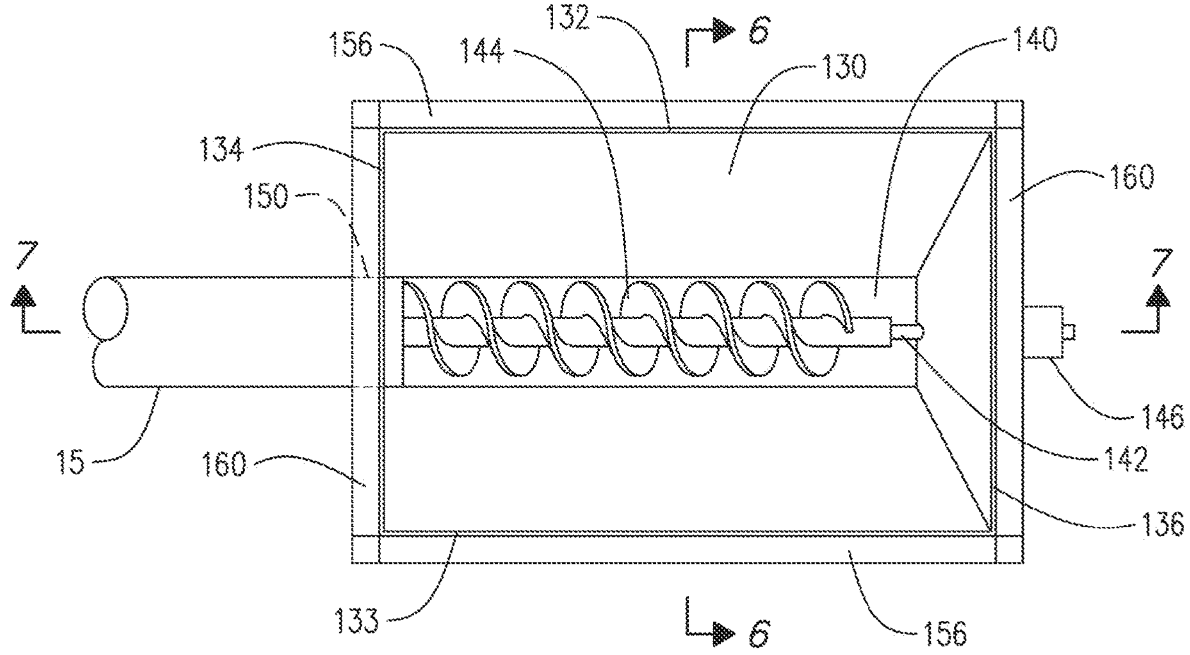
FIG. 5 is a view looking down at the interior of a container that may be used in the current system.
Figure 6:
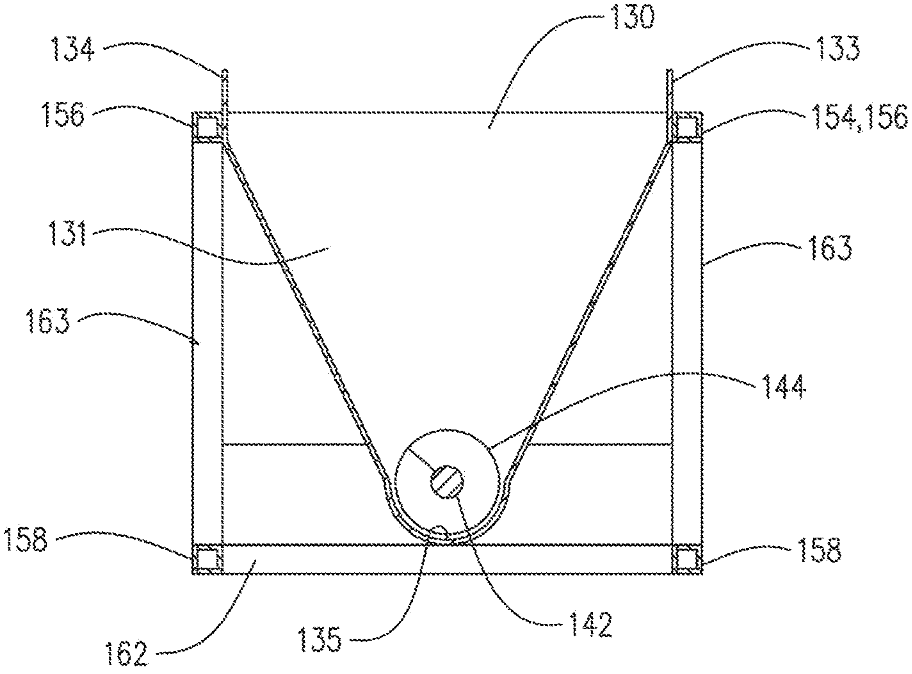
FIG. 6 is a cross section from line 6-6 of FIG. 5.
Figure 7:
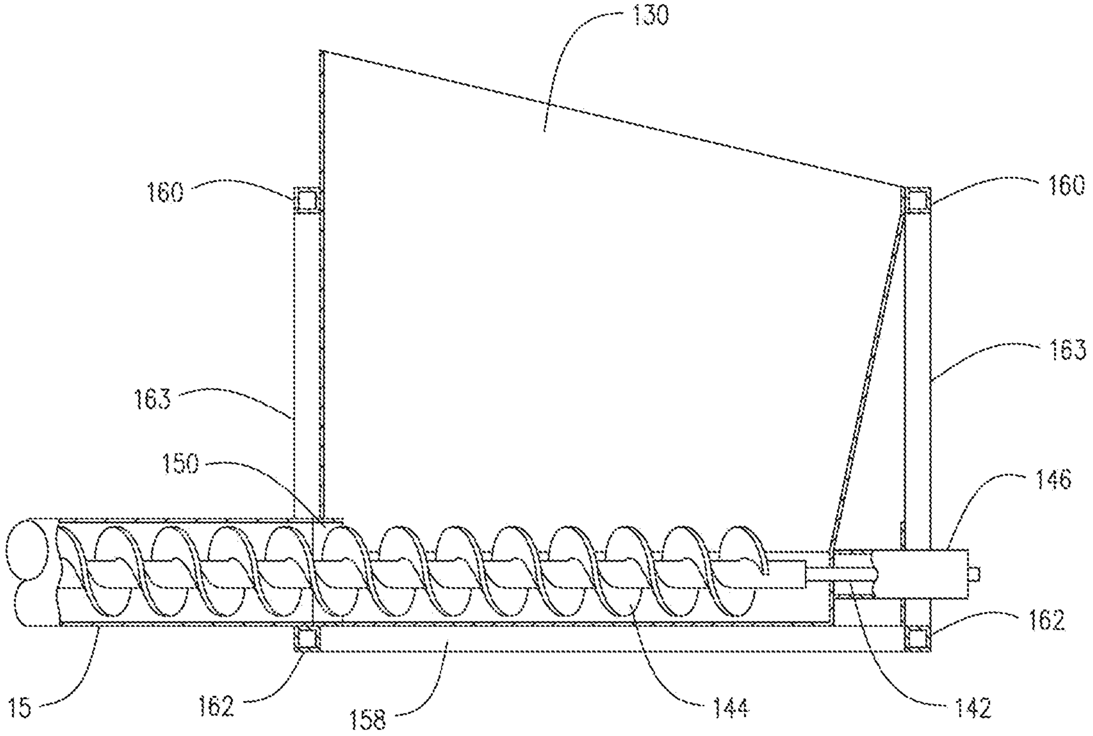
FIG. 7 is a cross section from line 7-7 of FIG. 5.

FIG. 3 is an illustration of a vertical concrete member 6 with multiple layers printed by the device 20. The cementitious mixture will be delivered into the space 25 defined by the device 20 through delivery opening 43 in first side plate 42. As the device 20 moves along the travel path, the cementitious mixture will be squeezed from the first width 32 in the receiving section 34 to final width 38 in the finish section 40 as it passes through convergent section 36. Once a first layer of the concrete member 6 of a desired length has been placed as depicted in FIG. 2, the device 20 may be lifted and the transport unit 200 utilized to move the device 20 back to a beginning point, for example, a first end of the vertical concrete member 6 being constructed. The process can be repeated in that the transport unit 200 will move horizontally along the travel path 8, the cementitious mixture will be delivered into the device 20 until a second layer of a desired length and height has been printed and placed. This process may be repeated multiple times to create a wall or other concrete member 6 of a desired height as shown for example in FIG. 3. Member 6 of a desired height and width may thus be constructed by making a plurality of passes along the travel path with the device 20 at sequentially increasing heights while delivering concrete into space 25 through delivery opening 43 in first side plate 42. The height is increased with each pass so that the layer being created by a single pass along the travel path will be placed atop the previously created layer. Concrete may also be placed continually around a defined perimeter of a structure. This would allow a concrete member to be created from a starting point and the delivery of a cementitious mix into device 20 would continue such that printing continues until the starting point is reached. The device 20 is then raised and the printing can continue in the same fashion around the perimeter to create additional layers of an enclosed structure. While the typical forms used for constructing concrete walls or other structures are not needed, it will be understood that a temporary form may be placed at the beginning point and end point for the structure being constructed. In other words, a temporary form or existing material such as a concrete or steel member may be positioned so that the initial or final placement of concrete has a surface that defines the beginning and ending of the constructed member. For example, as shown in FIG. 3 temporary forms 21 may be placed where the rear and forward ends 9 and 11 of wall 6 are to be located. The width of the temporary form 21 at forward end 11 will be such that it will be closely received in finish section 40 of device 20 as device 20 passes thereover.

Having described the primary components of system 5, the following will describe in more detail the methods of forming the concrete member using system 5. The following method applies to the formation of an initial concrete member 6 using a cementitious mix on the surface of the ground or other construction surface as well as the extension of concrete member 6 by the addition of subsequent layers to the existing structure. As an initial step, the method provides for the preparation of a mixture suitable for forming into concrete wall 6 or other concrete member such as but not limited to slabs, beams and other members. For the purposes of the following discussion the term concrete will be used to refer to any cementitious mixture regardless of the aggregates used; however, the method applies equally to the use of concrete mixtures that do not use coarse aggregates.

Figure 18:
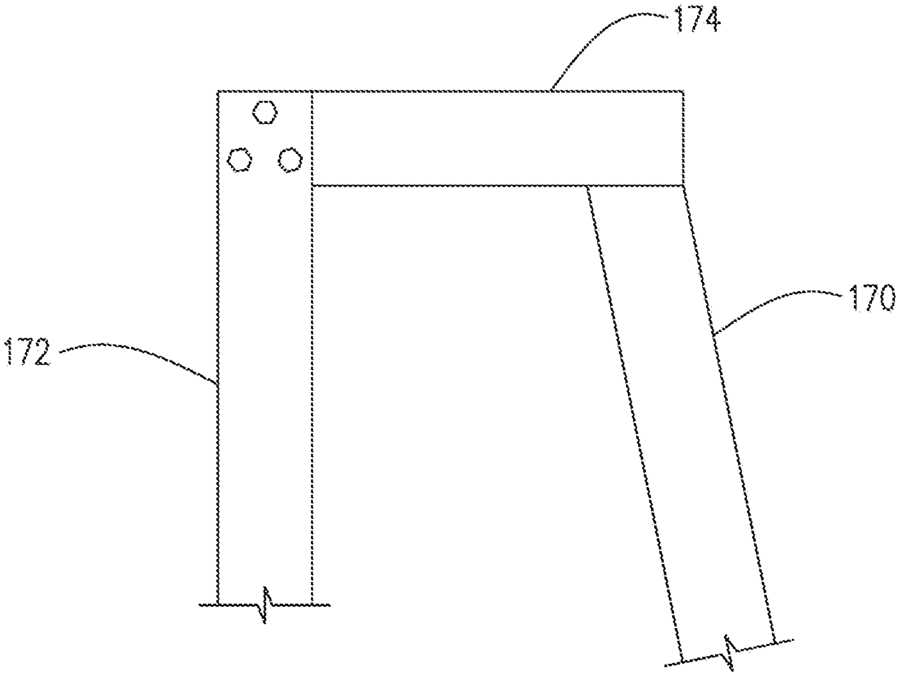
FIG. 18 is a table providing an exemplary cementitious mix that may be used with the system of the current disclosure.

As an initial step, the cementitious mixture is formed from a dry mix which when combined with water, aggregates and other components has a slump between 0" and about 8", when measured using American Standard Testing Method C143. The cementitious mix will be designed to have a high amount of cohesion as measured by the ability for the concrete to stack. This is measured by sequentially stacking extruded 4" diameter×8" long layers that are extruded from plastic molds on top of one another. A cementitious mix of known components is pushed into the plastic mold and is retained therein by placing a closure at the bottom end of the mold. The mold is turned to a generally horizontal position, and a first layer of the cementitious mix is pushed out of the plastic mold. The mix is allowed to rest for a time period, generally between about 10 minutes and 30 minutes, and the change in diameter is then measured across a plurality of axes. A limit of <10% change in diameter was determined to be the maximum amount of acceptable deviation. The deformation of each layer is measured as more layers are stacked. After a series of tests, the cementitious mix as described herein was selected based on the foregoing, with a rest time of about 20 minutes for each layer. The methods for mixing mixtures having the foregoing characteristics are well known in the art. In general, the dry mix formulation will comprise: portland cement and a supplementary cementitious material such as fly ash, slag, or natural pozzolans; however, these mixtures may contain calcium sulfoaluminate cements or calcium aluminate cements or any other binder. Typically, the dry mix to water mass ratio will be between about 0.40 and 0.50. One non-limiting example of a cementitious mixture which will be suitable for use in system 5 and having the indicated characteristics is provided by the table in FIG. 18. As shown therein, the cementitious mixture includes aggregate of different sizes (Coarse I and Coarse II and Fine I) Portland cement, fly ash and water. When using the mix formulation of FIG. 18, the dry mix to water ratio will be about 0.45. In this mixture a clay rheology modifying admixture is used. Several chemical admixtures are added that aim to disperse the cement grains and to modify the rate of reaction of the mixture. Non-limiting examples of such chemical admixtures include, but are not limited to napholene sulfonates, lignin sulfonates, citric acid, and polycarboxylate ethers. An air entraining agent may also be included to help with finishing and also to impart freeze thaw durability to the concrete. In FIG. 18, the citric acid dosage is 0.25% by weight of cementitious material (cement and fly ash for the presented mixture). Other formulations which will perform satisfactorily in the following method will be apparent to those skilled in the art. Typically, the cementitious mixture will be formed offsite and transported to the construction site by a ready mix truck or a volumetric mixer. However, on-site preparation of the cementitious mixture is an option. Further, in most formulations, on site addition of additives will not be required.

Following preparation of the cementitious mixture having the desired characteristics, the resulting mixture is placed in hopper interior 131 defined by container 10 by any convenient means such as delivery chute 148. As noted above, system 5 is a mobile system. Thus, system 5 will be prepositioned at the desired location prior to engaging auger 140. To initiate construction of concrete member 6, auger 140 located at bottom 138 of hopper interior 131 is engaged. Rotation of auger 140 delivers the cementitious mixture from hopper interior 131 to delivery pipe 15. As the cementitious mixture flows from delivery pipe 15 into space 25, moving equipment 202 also begins to move device 20 along path 8. As noted above, support arm 30 joins device 20 to container 10. Thus, movement of device 20 will also result in movement of container 10. Thus, the cementitious mixture will continuously flow from hopper interior 131 to delivery pipe 15 and space 25 during movement of system 5. Moving equipment 202 may vary from construction site to construction site. As nonlimiting examples, moving equipment 202 may be a track loader; however, in other instances moving equipment may take the form of an overhead support for device 20 and container 10. Other moving equipment like that described above are additional non-limiting examples. Operational control of system 5, including moving equipment may be manual, fully automated or partially automated as determined by the construction product. Likewise, other systems, for example pumps, may be utilized for the delivery of the cementitious mixture.

During formation of concrete member 6, the forward velocity of moving equipment 202 over travel path 8 will be determined by the physical characteristics of the final cementitious formulation. Typically, the velocity of moving equipment 202 will be between about 0.5 ft/s and 2.0 ft/min. During movement of equipment 202, the operation of auger 140 is managed to ensure a consistent flow rate of the cementitious mixture. Thus, the operation of system 5 provides a consistent thickness of the cementitious mixture during the formation of concrete member 6.

Optionally, the formation of concrete member 6 may include reinforcement members 22. When forming concrete member 6 with embedded reinforcement members 22, the reinforcement members 22 will be placed in travel path 8 prior to formation of concrete member 6 by device 20. Typically, reinforcement members 22 will be placed in travel path 8 prior to initiating operation of system 5. Reinforcement members 22 in one embodiment may be vertically oriented reinforcement members such as for example steel, fiberglass or other reinforcing members. Thus, as system 5 moves along path 8, operating space 25 will encompass reinforcement members 22 as the cementitious mixture flows into operating space 25. The open ended configuration of operating space 25 enables formation of a reinforced concrete member 6, i.e., formation of concrete member 6 around reinforcement members 22. As such, the structural integrity of concrete member 6 is not subsequently disturbed by placing the reinforcement members into the formed concrete member 6.

Accordingly, as device 20 moves along path 8, the cementitious mixture flows from delivery pipe 15, through delivery opening 43 located in first side plate 42 into space 25. In the described embodiment the cementitious mixture is delivered into space 25 through delivery opening 43 defined in first side plate 42. However, other arrangements are possible, so long as the cementitious mixture is delivered into the space 25 as device 20 is moving along travel path 8. As device 20 moves forward, the cementitious mixture is squeezed from the first width 32 defined by and between plates 42 and 44 in first section 34 to the second and narrower width 38 defined by and between first and second side plates 42 and 44 in third section 40 which may be the finished width of the concrete member being formed. Thus, as device 20 moves along travel path 8, horizontal in the depictions in FIG. 2, the portion of the concrete member 6 that passes out of the device 20 will remain upright with no stationary forms or other support. In other words, the portion of the concrete member 6 will hold the shape created by device 20, whether the orientation is vertical or otherwise, without the use of stationary forms. The squeezing of the cementitious mixture by device 20 creates a desired finish for the concrete member 6 and also consolidates the cementitious mixture around the reinforcing members 22 in finishing section 40. As a result, no additional support is needed for the portion of the concrete member 6, such as for example a vertical concrete wall 6, that is created as the device 20 moves along the travel path 8. In one aspect, the prepositioning of reinforcement members 22 further reduces the need for stationary forms as concrete member 6 is formed around reinforcement members 22 and is not subsequently disturbed by their introduction to the formed concrete member. Of course, the current method is equally applicable to the formation of concrete member 6 lacking reinforcement members 22 such as rebar or structures that contain fiber reinforcement.

During formation of concrete member 6, the cementitious mixture enters space 25 of device 20. Containment section 46 of second side plate 44 serves to prevent the mixture from spilling out of the device 20 past forward edge 64. As depicted, receiving section 48 is generally parallel to the horizontal direction of travel of the concrete forming device 20 as concrete member 6 is being formed and containment section 46 is angled inwardly at an angle 120. Containment of the cementitious mixture ensures that substantially all of the mixture passing into space 25 of device 20 will be squeezed as it passes from width 32 in section 34 to width 38 in section 40. Since width 38 is narrower than width 32, width 38 defines the finished or desired width of the concrete member 6.

Figure 12:
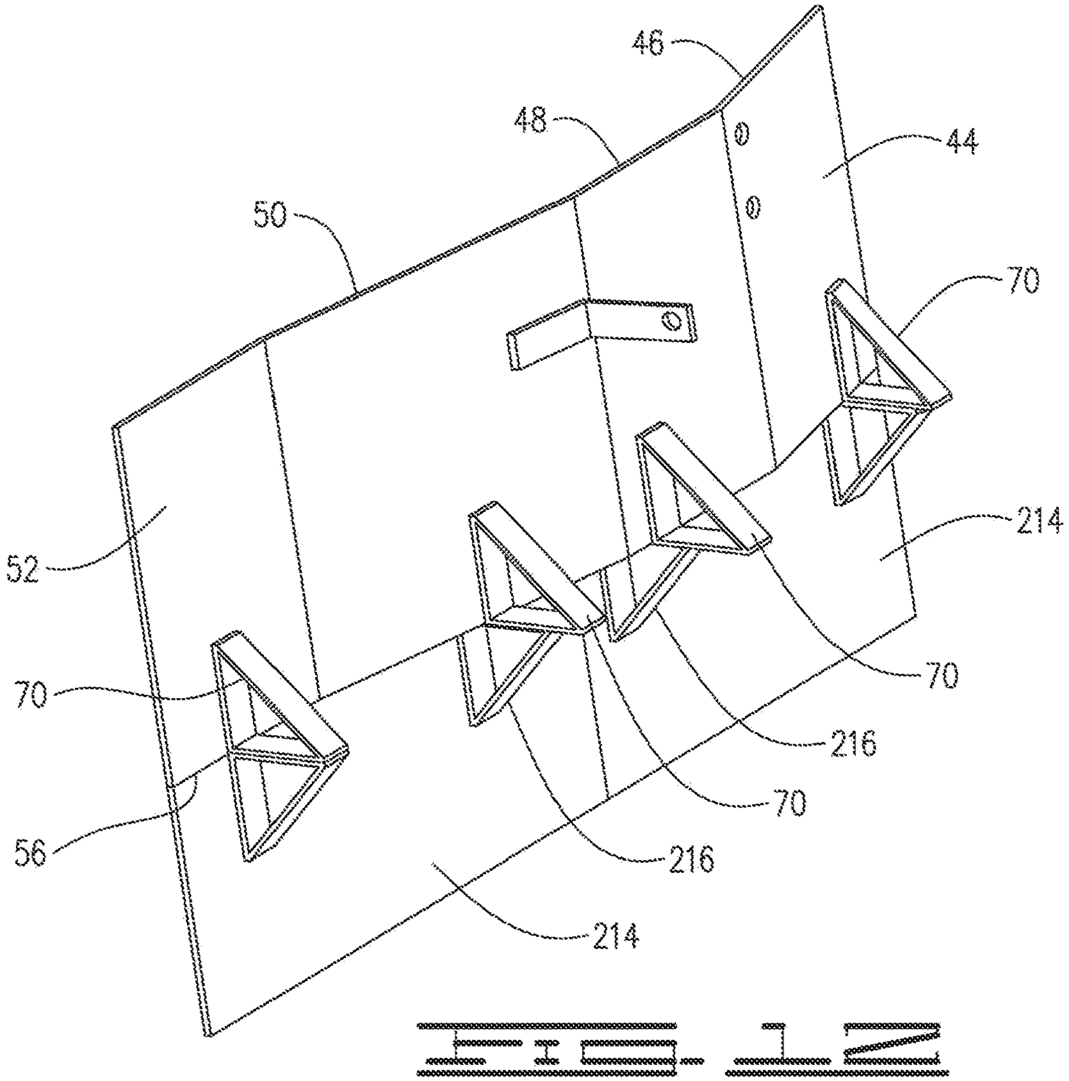
FIG. 12 is a perspective view showing drop down plates connected to the second side plate of the concrete member forming device.
Figure 13:
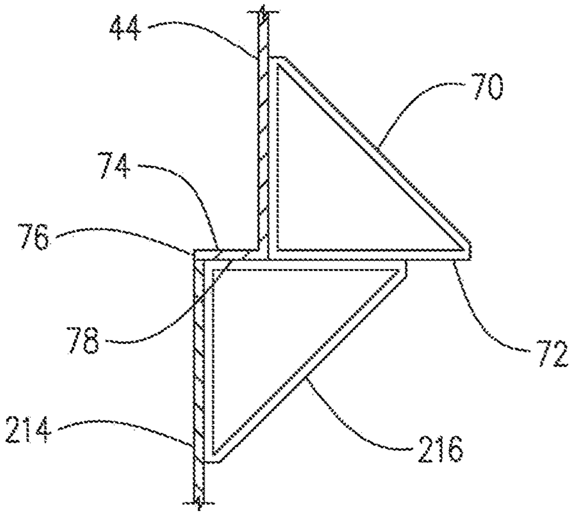
FIG. 13 is a cross section through lines 13-13 in FIG. 9.
Figure 14:
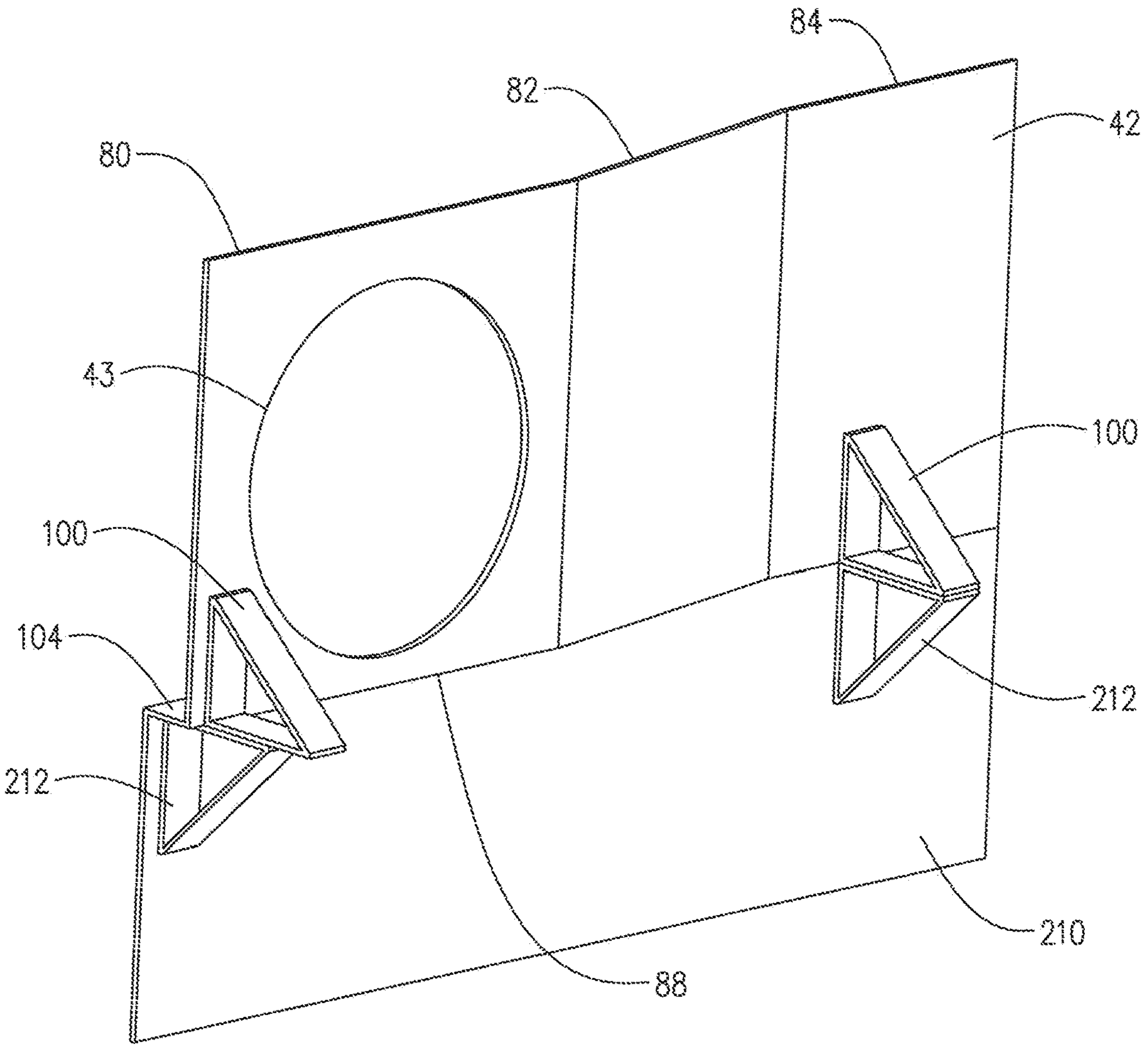
FIG. 14 shows drop down plates connected to the first side plate of the concrete member creating device.
Figure 15:
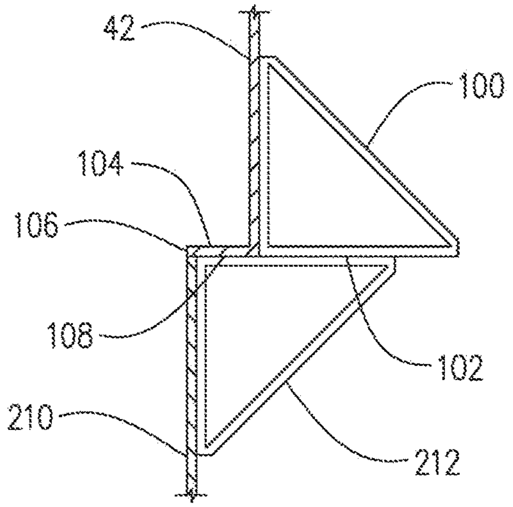
FIG. 15 is a cross section through line 15-15 of FIG. 9.

In certain embodiments drop down plates may be utilized as the device is raised to place the second and higher layers. Drop down plates 210 for first side plate 42 are shown in FIGS. 14 and 15. Drop down plates 210 are generally flat plates that are connected with angle brackets 212 to the angle brackets 100 on first side plate 42. Drop down plates 210 are positioned so that they are directly aligned with, and thus coplanar with finish section 84 on first side plate 42 Drop down plates 214 for second side plate 44 are shown in FIGS. 12 and 14. Drop down plates 214 are connected with angle brackets 216 to angle brackets 70 on second side plate 44. Drop down plates 214 are connected so that they are aligned with, and thus coplanar with finish section 52 of second side plates 44. Drop down plates 210 and 214 when utilized will be spaced apart a distance 218 which is identical to width 38 of finish section 40 of space 25. Drop down plates 210 and 214 may be utilized for example to provide additional finish and/or additional support to previously placed layers as the device 20 is moved upwardly to construct a concrete member 6 of a desired height. However, it is understood that drop down plates 210 and 214 are not necessary and that each layer that is placed is self-supporting.

Figure 17:
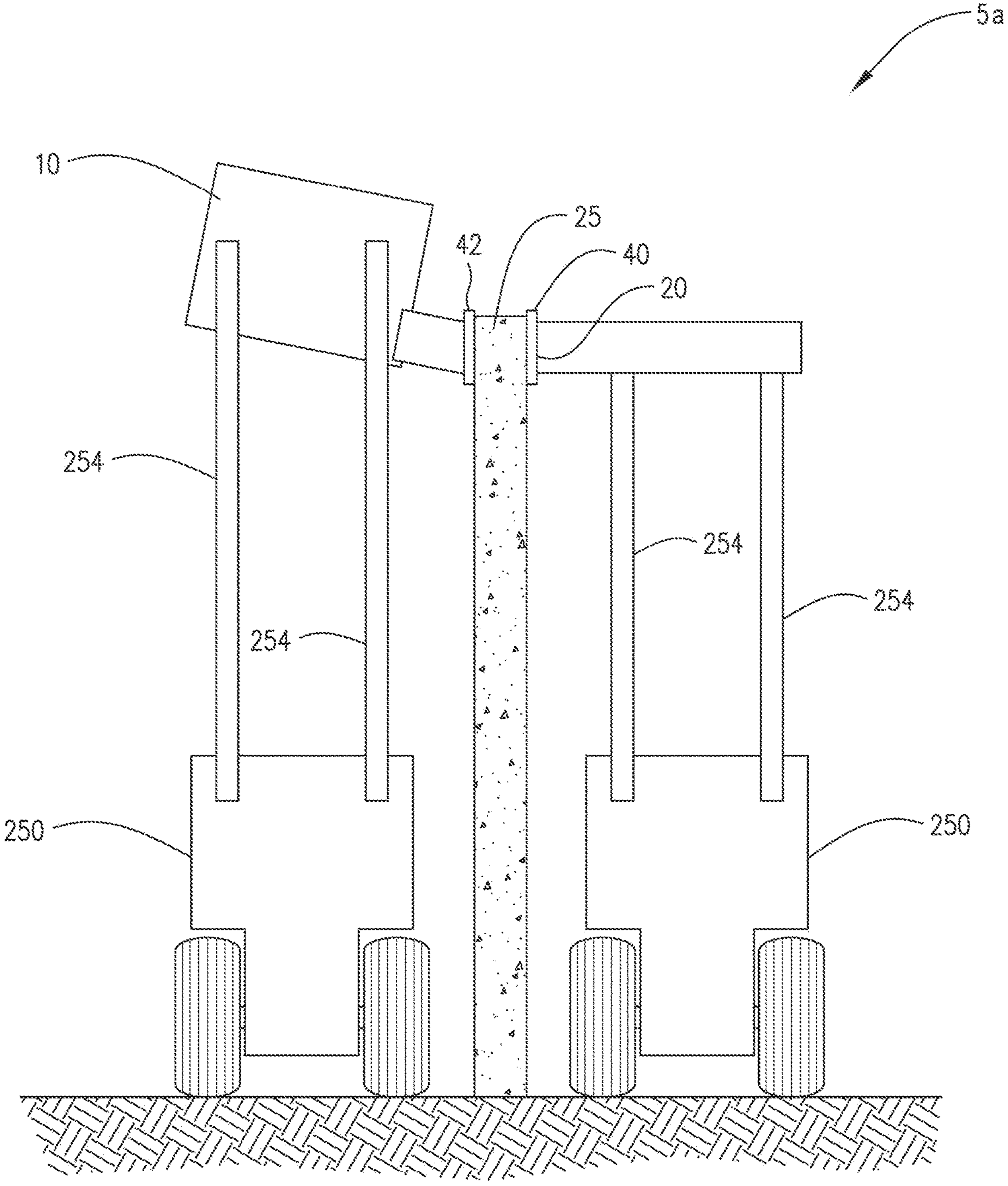
FIG. 17 is a schematic of a system using multiple transport units for a concrete member creating device.

An embodiment of a system 5*a* is schematically shown in FIG. 17. System 5*a* includes a device 20 with a space 25 as previously described. A mixture, for example a cementitious mix is delivered into space 25 from a container 10 through delivery pipe 15. System 5*a* however includes two separate transport units, identified as transport units 250 and 252. Transport units 250 and 252 may be of the type described herein. Transport unit 250 is connected to container 10 with arms 254 that may be of a type that will extend and retract. Transport unit 252 is connected to second side plate 44 with arms 256, which likewise may be of a type that extend and retract. Transport units 250 and 252 will be in communication such that side plates 42 and 44 are moved at the same rate of speed in the direction along the travel path. In other words, the plates 42 and 44 move synchronously in the direction of the travel path. However, using such a configuration, the first and second plates 42 and 44 are allowed to move independently to the left and/or right as depicted in the figure. Such a configuration allows the construction of a tall structure such as a wall, with a varying width, or with a curved outer surface.

Other embodiments of the present invention will be apparent to one skilled in the art. As such, the foregoing description merely enables and describes the general uses and methods of the present invention. Accordingly, the following claims define the true scope of the present invention.

What is claimed is:

1. A system for forming a concrete member comprising:

a first side plate defining a delivery opening for permitting flow of a cementitious mixture through the first side plate; and a second side plate movable with the first side plate in a first pass along a travel path, the second side plate spaced from the first side plate along an axis transverse to the travel path, the first side plate extending along a first plane transverse to the axis, the second side plate extending along a second plane transverse to the axis, the first side plate and second side plate defining a space therebetween to receive the cementitious mixture, wherein the first side plate and the second side plate are configured to squeeze the cementitious mixture as the first and second side plates move along the travel path.

2. The system of claim 1, wherein the space is at least partially defined by a first width and a second width adjacent the first width, wherein the second width is narrower than the first width to squeeze the cementitious mixture as the concrete member creating device moves along the travel path.

3. The system of claim 1, further comprising:

a container having a receiving opening; and a delivery pipe connected to the container and the first side plate, the delivery pipe communicating the cementitious mixture to the space defined by the first and second side plates through the delivery opening in the first side plate.

4. The system of claim 3 further comprising:

a support arm connected to the container and to the second side plate; and a container transport unit movably connected to the container, the container and the first side and second side plates movable together by the container transport.

5. The system of claim 4, the support arm comprising:

a first beam connected to the container and extending upwardly therefrom; and a second beam connected to the first beam, the second beam extending downwardly and connected to an exterior side of the second side plate.

6. The system of claim 1, further comprising a plurality of spaced apart reinforcement members positioned in the desired travel path.

7. The system of claim 1 further comprising:

a container;

a container transport unit connected to the container, the container being movable by the container transport unit;

a delivery pipe connected to the container and the first side plate, the delivery pipe communicating the cementitious mixture from the container to the space defined by the first and second side plates through the delivery opening; and a support arm connected to the container and to the second side plate, the first side plate and second side plate movable together with the container.

8. The system of claim 1, the concrete member comprising one of a slanted, curved or an upright member.

9. The system of claim 1 further comprising a first transport unit connected to the first side plate and a second transport unit connected to the second side plate, the first and second transport units configured to move the first and second side plates synchronously in the direction of the travel path.

10. The system of claim 1, the first and second side plates movable upwardly to an increased height sufficient to provide, in an additional pass along the travel path at the increased height, for the placement of the cementitious mix on top of the cementitious mix delivered through the concrete creating device in the first pass.

11. A method of creating a concrete member using the system according to claim 1, the method comprising:

positioning a plurality of reinforcement members in the travel path of the first side plate and the second side;

moving the first side plate and the second side plate along the travel path past the reinforcement members;

delivering the cementitious mixture into the space defined by the the first side plate and the second side plate through the delivery opening of the first side plate as the first side plate and the second side plate along the travel path; and squeezing the cementitious mixture with the first side plate and the second side plate as the first side plate and the second side plate moved to create a first layer of the concrete member.

12. The method of claim 11 further comprising:

lifting the first side plate and the second side plate after the first side plate and the second side plate has traveled a desired distance along the travel path to create the first layer;

returning the first side plate and the second side plate to a desired location along the travel path; and repeating the moving the first side plate and the second side plate step, the delivering step, and the squeezing step above the first layer of the concrete member to create a second layer of the concrete member atop the first layer of the concrete member.

13. The method of claim 12 further comprising;

lifting the first side plate and the second side plate after the first side plate and the second side plate has traveled the desired distance along the travel path for the second layer of the concrete member;

returning the first side plate and the second side plate to a desired location along the travel path; and repeating the moving the first side plate and the second side plate step, delivering step, squeezing step, lifting step and returning steps above the second layer of the concrete member a desired number of times to create additional layers of the concrete member atop the first and second layers until the concrete member has reached a desired height.

14. The method of claim 11, further comprising moving the first and second side plates with a single transport unit.

15. The method of claim 11, further comprising moving the first and second side plates in a synchronous manner with first and second transport units respectively.

16. A system for creating a concrete member comprising:

a container for receiving a cementitious mix;

a cementitious mix delivery device;

a concrete member creating device connected to the container, the concrete member creating device defining a space between a first side plate and a second side plate, wherein the space is configured to receive the cementitious mix, wherein the space is at least partially defined by a first width and a second width adjacent the first width, and wherein the second width is narrower than the first width to squeeze the cementitious mixture as the concrete member creating device moves along a travel path; and a delivery pipe connected to the container and the concrete member creating device, the delivery pipe communicating the cementitious mix from the container into the space defined by the concrete member creating device;

wherein the container and concrete member creating device are configured to move together in successive passes along the travel path at sequentially increasing heights as the cementitious mixture is delivered into the space defined by the concrete member creating device to create a concrete member of a desired height and length, wherein the first side plate defines a delivery opening communicatively coupled with the delivery pipe, and the second side plate is spaced from the first side plate along an axis transverse to the travel path, the first side plate extending along a first plane transverse to the axis, and the second side plate extending along a second plane transverse to the axis.

17. The system of claim 16, the first side plate having a receiving, a converging and a finishing section, the finish section of the first side plate being parallel to a direction of travel of the concrete member creating device along the desired travel path, and the converging section of the first side plate being angled outwardly from the finish section of the first side plate at an angle in the range of about 5° to about 15°, the second side plate having a catch section, a converging section and a finish section, the finish section of the second side plate being parallel to the finish section of the first plate, the converging section of the second side plate being angled outwardly from the finish section of the second side plate at an angle in the range of about 5° to about 15°.

18. The system of claim 17, a width between the finish section of the second side plate and the finish section of the first side plate defining a desired thickness of the concrete member.

19. The system of claim 16, further comprising a support arm connected to the container and to the second side plate, the support arm configured to extend upwardly from the container and above the first side and second side plates to connect to an exterior side of the second side plate.

20. The system of claim 16, the delivery device being positioned in the container.

21. The system of claim 20, the delivery device comprising a rotating auger.

22. The system of claim 16, further comprising a plurality of spaced apart reinforcing members positioned in the travel path.

23. A method of creating a concrete member using the system according to claim 16, the method comprising:

positioning a plurality of reinforcement members in the travel path of the concrete member creating device;

making a first pass with the concrete member creating device along the travel path past the reinforcement members;

delivering the cementitious mixture into the space defined by the concrete member creating device through the first side plate of the concrete member creating device during the first pass; and squeezing the cementitious mixture from a first width to a second width with the concrete member creating device during the first pass to create a first layer of the concrete member.

24. The method of claim 23 further comprising making successive passes along the travel path at sequentially increasing heights.

25. The method of claim 23 further comprising connecting a drop down plate to the first and second side plates after the first layer has been placed and making the successive passes with the drop down plates attached.

26. The method of claim 23 further comprising moving the first side plate with a first transport unit and moving the second side plate with a second transport unit.

* * * * *